Feb. 10, 1931.　　　K. E. LYMAN　　　1,791,627
BRAKE
Filed Sept. 19, 1927

INVENTOR
KENNETH E. LYMAN
BY
M. W. McConkey
ATTORNEY

Patented Feb. 10, 1931

1,791,627

UNITED STATES PATENT OFFICE

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS

BRAKE

Application filed September 19, 1927. Serial No. 220,316.

This invention relates to brakes and is illustrated as embodied in an internal expanding automobile brake. An object of the invention is to provide a hydraulic or other fluid operating means for a brake which can be adjusted in such a manner as to change its leverage on a brake. With this arrangement it is possible to adjust the four brakes of a car differently so that while they receive equal pressures from the hydraulic operating connections they nevertheless act unequally on the brakes and thus compensate for unavoidable differences in co-efficient of friction, etc., which affect the retarding power of the respective brakes.

Preferably the hydraulic operating device is arranged to operate directly on the free ends of the brake shoes or their equivalents and is adjustable toward and from the pivot points of the shoes, thus varying its effective leverage.

Figure 1:
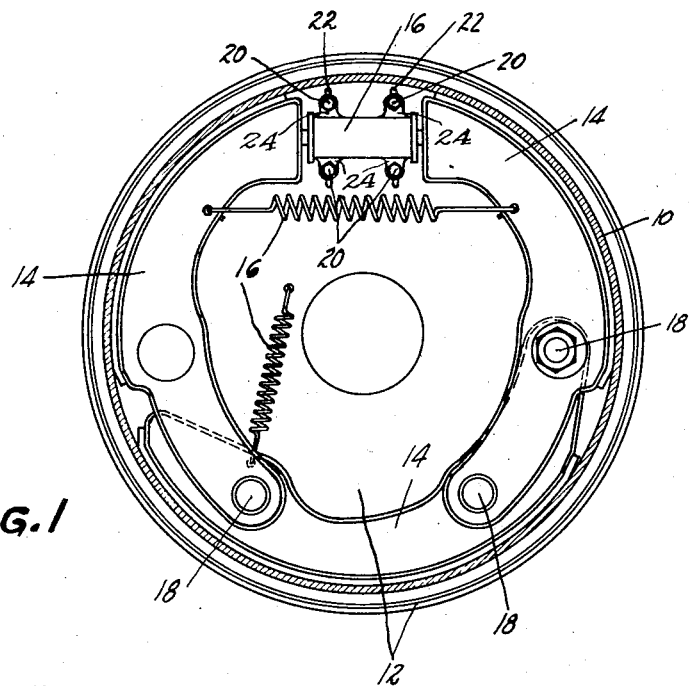
Figure 2:
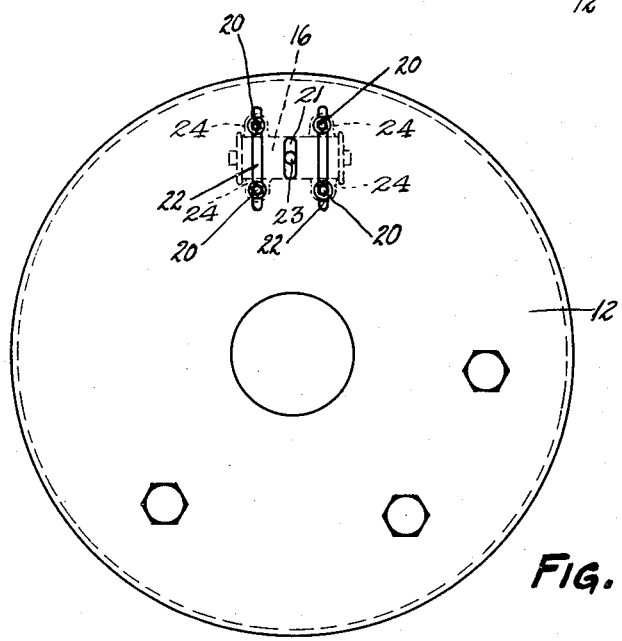

The above and other objects and features of the invention, including various novel and desirable details of construction, will be apparent from the following description of one illustrative embodiment shown in the accompanying drawings, in which:

Figure 1 is a vertical section through the brake just inside the head of the brake drum and showing the brake shoes in side elevation; and Figure 2 is an inside elevation of the backing plate of the brake, looking in the opposite direction from Figure 1.

The brake selected for illustration includes a rotatable brake drum 10, at the open side of which is arranged a support such as a backing plate 12, and within which are arranged pivoted brake shoes 14 operated by a hydraulic device against the resistance of return springs 16. The particular brake illustrated is substantially as more fully described in Patent No. 1,567,716, granted Bendix Brake Company on December 29, 1925, on an application of A. Y. Dodge.

The hydraulic device 16 which applies the brake may be of any desired form, but preferably comprises oppositely movable pistons within the cylinder, which pistons contact the shoes 14. The present application relates to the arrangement and adjustment of this operating device.

Preferably the hydraulic device 16 or its equivalent is arranged directly between the free ends of the two upper brake shoes 14 and forces those shoes directly apart in applying the brake in such a manner as to bring them into engagement with the brake drum 10.

According to an important feature of the invention, the hydraulic device 16 is mounted in such a manner that it can be adjusted with respect to the pivot points 18 of the brake shoes 14, for example by being secured by bolts 20 passing through lugs 24 and slots 22 in the backing plate 12. By loosening the bolts 20 the operating device 16 may be raised or lowered to change its effective leverage in applying the brake by varying its distance from pivot points 18, whereupon the bolts 20 are tightened up to preserve the adjustment so made. The backing plate is necessarily slotted at 21 to accommodate the fluid conduit 23.

The above-described adjustment is particularly desirable in a set of four-wheel hydraulic brakes. It very seldom happens that the four brakes of an automobile will have the same retarding force, and therefore the application of equal power to the four brakes with the usual hydraulic operating mechanism results in an unequal retarding force on the four wheels. In mechanical four-wheel brakes provision is made for varying the leverage on the four brakes so that the less effective brakes have a high leverage, and vice versa. By the present invention it becomes possible to use hydraulic brakes in the same manner by providing the more effective leverage of the hydraulic operating mechanism for the less effective brake.

While one illustrative embodiment has been described in detail, it is not my intention to limit the scope of the invention to that particular embodiment or otherwise than by the terms of the appended claims.

I claim:

1. A brake comprising, in combination, retarding means, a fluid-operating device for said retarding means, and a bodily movable mounting for the fluid-operating device permitting it to be adjusted to change its point of contact with the retarding means.

2. A brake comprising, in combination, a brake support, a plurality of pivoted shoes having free ends spaced a short distance apart, and a hydraulic operating device directly secured to said support and arranged between and acting directly on said free ends and which is adjustable to vary its position with respect to the pivoted ends of said shoes.

3. A brake comprising, in combination, retarding means acting as a lever, a brake support, a fluid-operating device for said retarding means, and means on said device cooperating with said support to effect an adjustment of said device to change the leverage of the retarding means during its braking action.

4. A brake comprising, in combination, retarding means, a brake support, a fluid-operating device for said retarding means secured to said support, said device and support being so constructed and arranged as to permit their relative adjustment.

5. A brake comprising, in combination, retarding means, a fluid-operating device for said retarding means, and a vertically adjustable, bodily movable mounting for said device having no connection with the retarding means of the brake.

6. A brake comprising, in combination, retarding means having free ends spaced apart and a hydraulic operating device disconnectedly engaging, arranged between and acting directly on said free ends and which device is bodily movable to effect an adjustment of the brake.

7. A brake comprising, in combination, a brake support having slots therein, together with a fluid-operated device having means passing through said slots for relative adjustment with said support.

8. A brake comprising, in combination, retarding means, a fluid operating device contacting therewith, said operating device being movable to shift its points of contact with said retarding means.

In testimony whereof, I have hereunto signed my name.

KENNETH E. LYMAN.